(12) United States Patent  
Torigoe et al.

(10) Patent No.: US 7,409,486 B2
(45) Date of Patent: Aug. 5, 2008

(54) STORAGE SYSTEM, AND STORAGE CONTROL METHOD

(75) Inventors: Osamu Torigoe, Odawara (JP); Hideaki Shima, Odawara (JP); Shouji Katoh, Odawara (JP)

(73) Assignee: Hitachi, Ltd., Tokyo (JP)

( * ) Notice: Subject to any disclaimer, the term of this patent is extended or adjusted under 35 U.S.C. 154(b) by 178 days.

(21) Appl. No.: 11/389,158

(22) Filed: Mar. 27, 2006

(65) Prior Publication Data
US 2007/0180180 A1 Aug. 2, 2007

(30) Foreign Application Priority Data
Jan. 30, 2006 (JP) ............................. 2006-020072

(51) Int. Cl.
G06F 12/00 (2006.01)
G06F 13/36 (2006.01)
G06F 3/00 (2006.01)

(52) U.S. Cl. .................. 710/311; 710/306; 712/207; 711/147; 711/137; 711/162

(58) Field of Classification Search ................ 710/306, 710/311; 712/207
See application file for complete search history.

(56) References Cited

U.S. PATENT DOCUMENTS

| | | | |
|---|---|---|---|
| 5,751,975 A * | 5/1998 | Gillespie et al. | 710/315 |
| 5,887,151 A * | 3/1999 | Raz et al. | 712/206 |
| 6,578,102 B1 * | 6/2003 | Batchelor et al. | 710/310 |
| 6,754,897 B1 * | 6/2004 | Ofer et al. | 718/103 |
| 6,782,444 B1 * | 8/2004 | Vishlitzky et al. | 711/4 |
| 6,795,876 B1 * | 9/2004 | Solomon | 710/34 |
| 6,928,508 B2 * | 8/2005 | Tse | 710/313 |
| 6,950,915 B2 * | 9/2005 | Ohno et al. | 711/162 |
| 7,032,041 B2 * | 4/2006 | Sahara et al. | 710/38 |
| 7,111,119 B2 * | 9/2006 | Minowa | 711/114 |
| 7,238,218 B2 * | 7/2007 | Hepner et al. | 711/137 |
| 2003/0229764 A1 * | 12/2003 | Ohno et al. | 711/147 |
| 2006/0080503 A1 * | 4/2006 | Araki et al. | 711/113 |

FOREIGN PATENT DOCUMENTS

JP 09-231164 2/1996

* cited by examiner

Primary Examiner—Paul R. Myers
Assistant Examiner—Brian Misiura
(74) Attorney, Agent, or Firm—Reed Smith LLP; Stanley P. Fisher, Esq.; Juan Carlos A. Marquez, Esq.

(57) ABSTRACT

A protocol chip and a bridge are connected to a first bus, while the bridge and a micro processor (MP) are connected to a second bus. The MP generates parameter information and writes it into a local memory (LM), and issues a write command which includes access destination information to this parameter information to a protocol chip. The bridge prefetches the parameter information from the LM using the access destination information within the write command which is transferred to the protocol chip via itself, and when receiving a read command from the protocol chip, transmits the parameter information which has been pre-fetched to the protocol chip via the first bus, without passing the read command through to the MP.

4 Claims, 10 Drawing Sheets

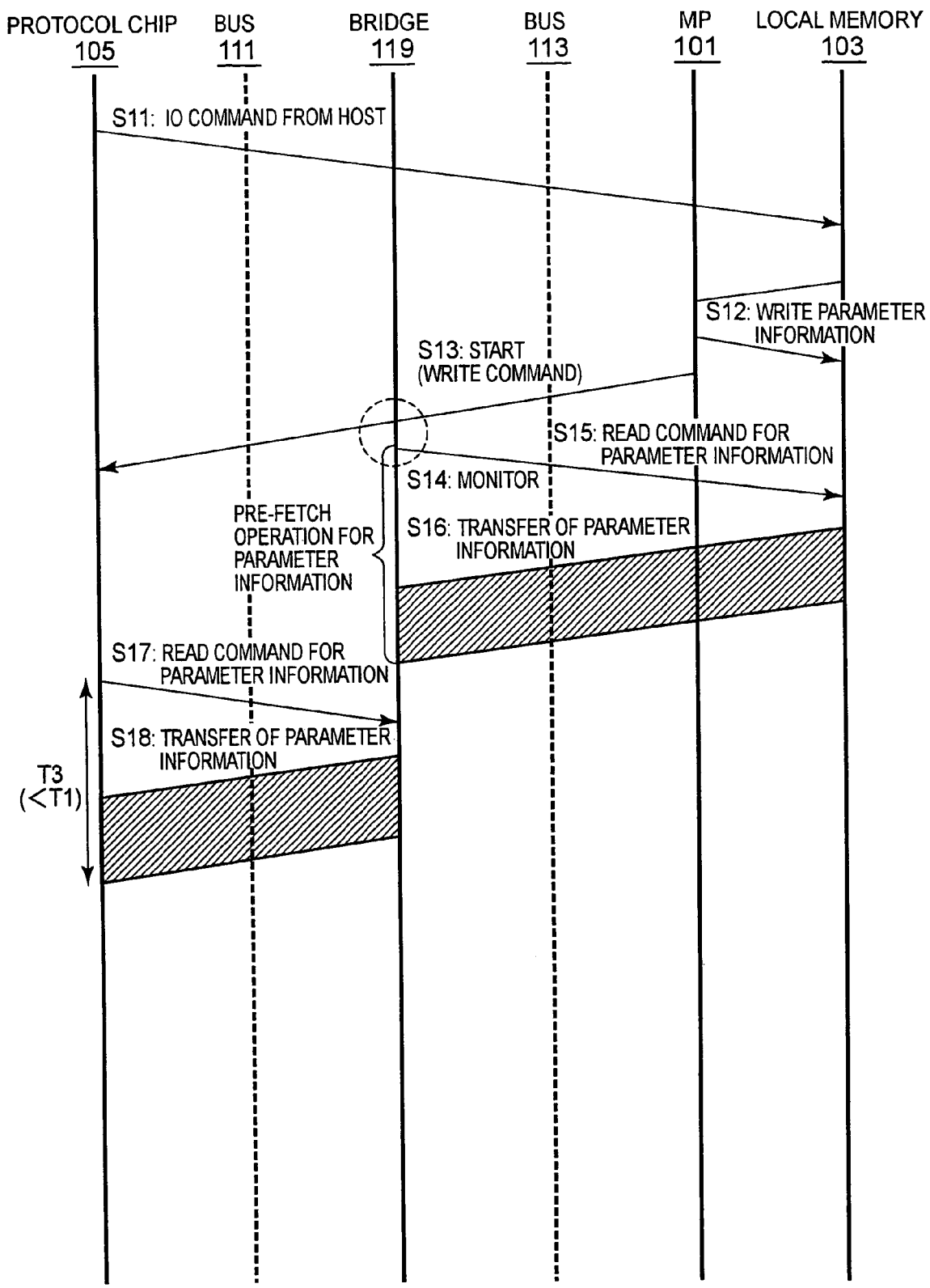

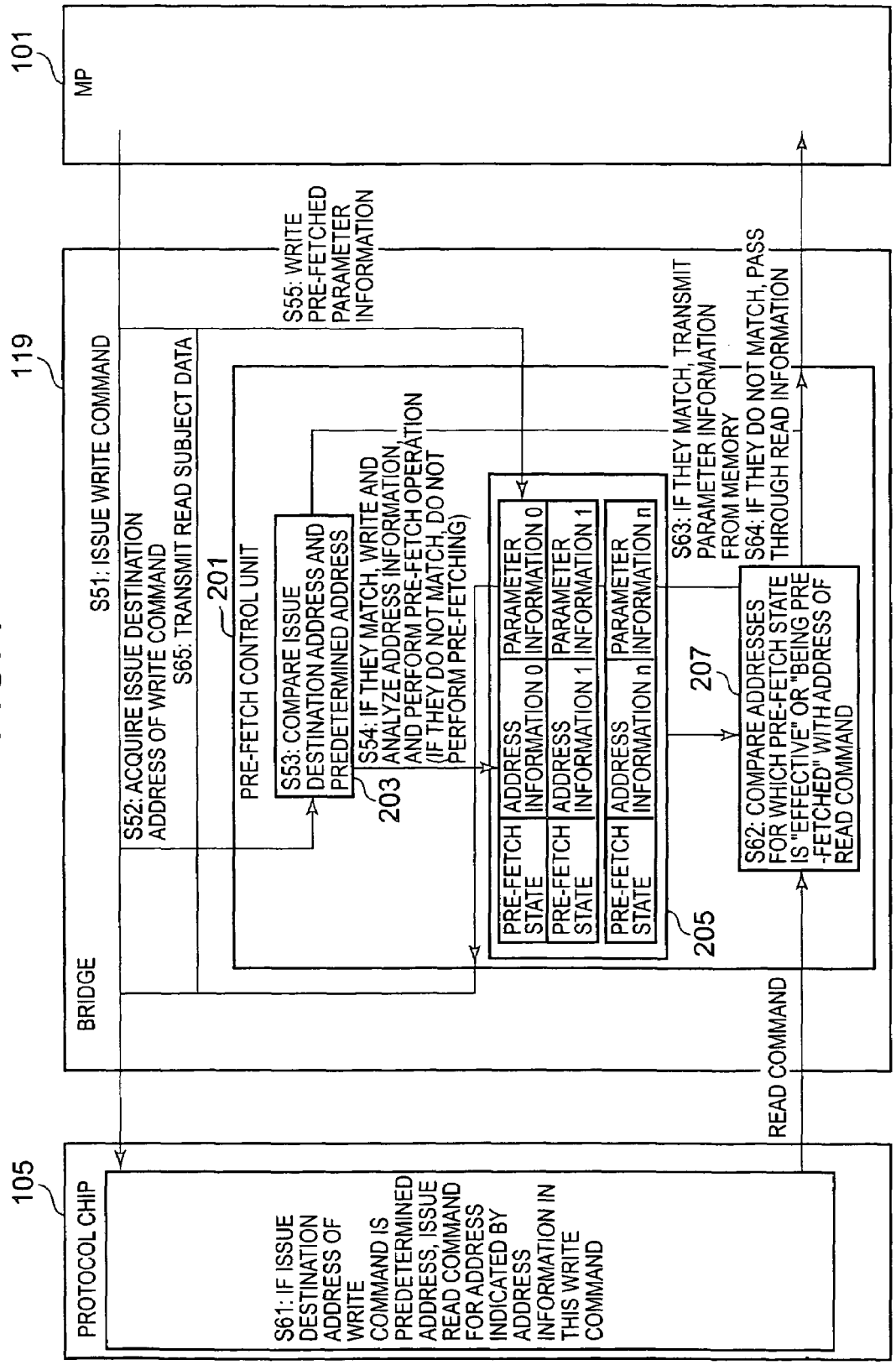

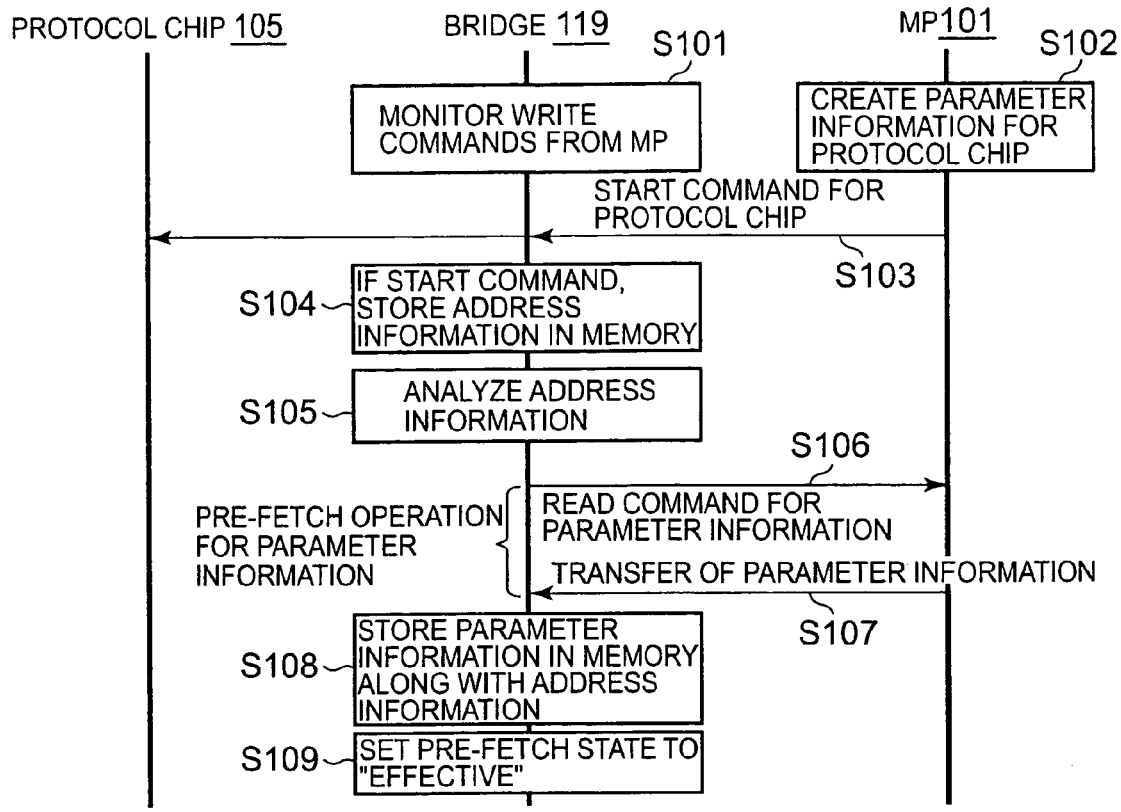
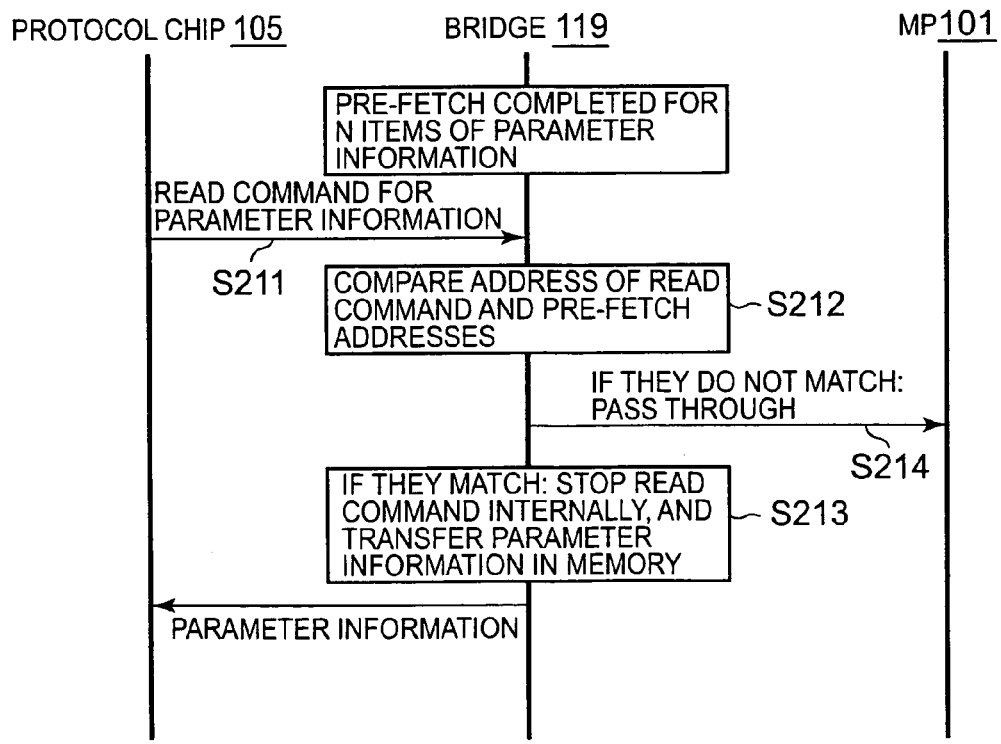

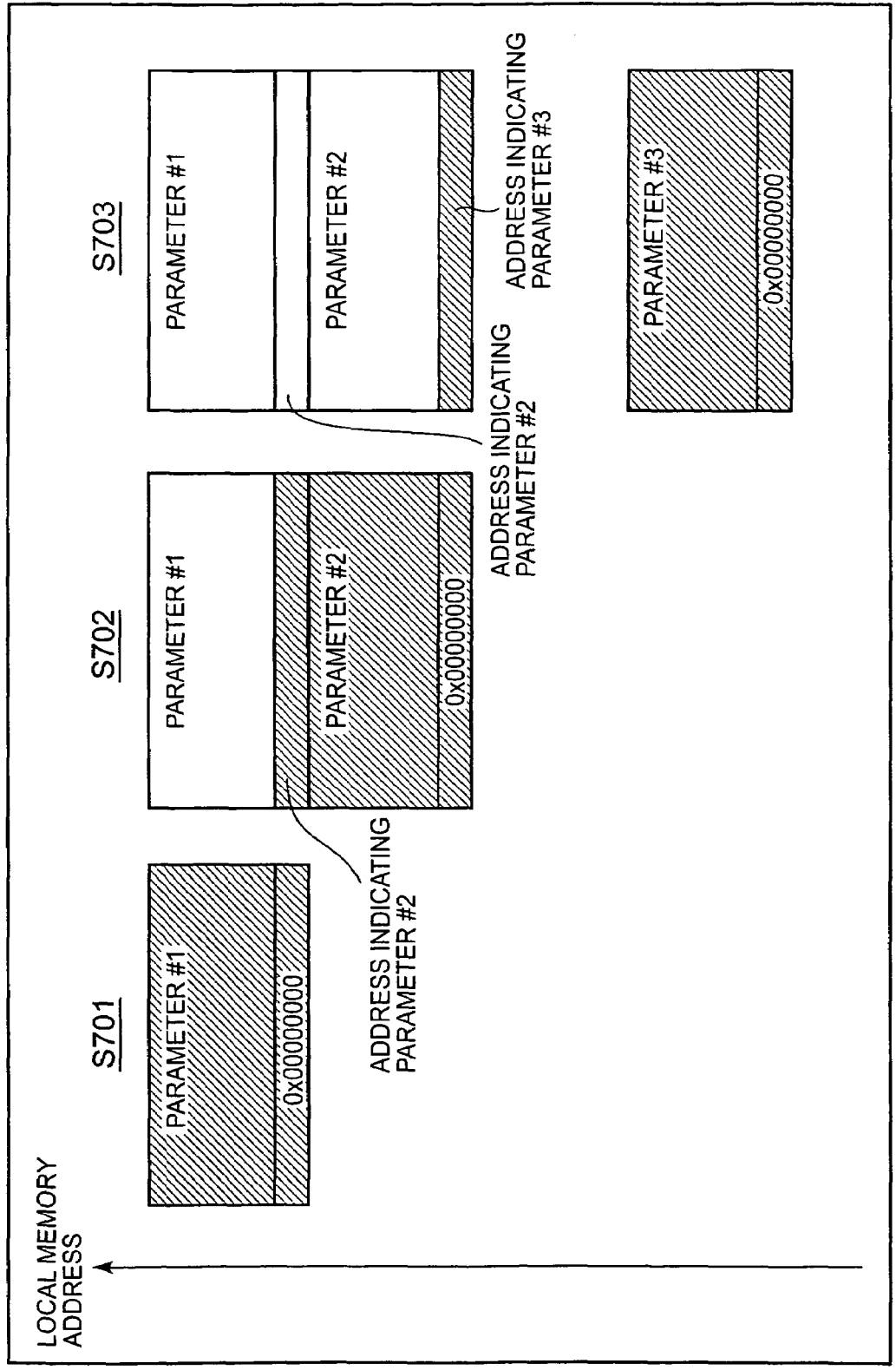

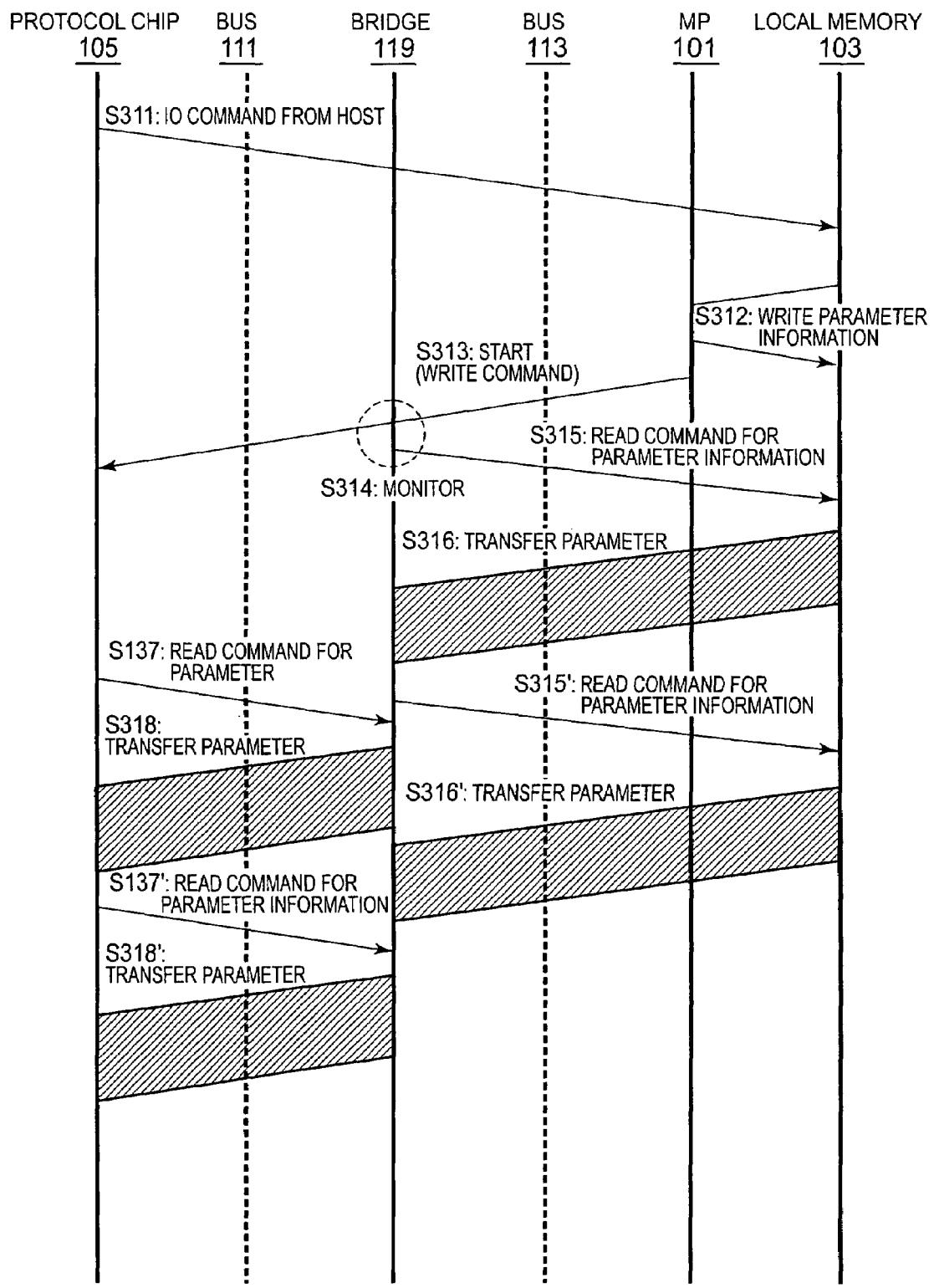

STORAGE SYSTEM, AND STORAGE CONTROL METHOD

CROSS-REFERENCE TO PRIOR APPLICATION

This application relates to and claims priority from Japanese Patent Application No. 2006-20072, filed on Jan. 30, 2006, the entire disclosure of which is incorporated herein by reference.

FIELD OF THE INVENTION

The present invention relates to the pre-fetching of data, and in particular relates to a storage control device of a storage system.

BACKGROUND OF THE INVENTION

For example, the technique known in Japanese Patent Laid-Open Publication Heisei 9-231164 is per se known. In this prior art of the publication, a CPU is connected to a high speed bus and a low speed I/O device is connected to a low speed bus, and a bus bridge is connected between the two buses. When the CPU is to read data from the low speed I/O device, it writes the address of the low speed I/O device in which this data is stored to the bus bridge, and the bus bridge reads out the data in the address which has been written from the CPU from the low speed I/O device and stores it. By doing this, the data which the CPU wishes to read is pre-fetched to the bus bridge. The CPU is able to acquire data from the low speed I/O device by reading in the pre-fetched data in the bus bridge from the bus bridge.

SUMMARY OF THE INVENTION

According to the above described prior art disclosed in the publication, the CPU itself which requests the data to be read out, after having found out in advance which is the data which it wants and in which address, issues a write command for writing this address into the bus bridge, and is thereafter required to issue a read command for reading this data. In other words, the number of CPU transactions is increased unnecessarily. Due to this, the data processing speed comes to be reduced.

This point is a problem, in particular, when applying the above described prior art data pre-fetching technique in the publication to a storage control device of a storage system.

That is to say, for example, with a storage system like a disk array system in which there are provided a plurality of disk type storage devices (for example hard disk drives) set up in an array, apart from this plurality of storage devices, there is also provided a storage control device which controls access to the storage devices. Such a storage control device comprises a circuit (hereinafter termed a protocol chip) for controlling sending and receiving of data according to a predetermined protocol (for example a fibre channel standard protocol), and a micro processor for analyzing commands from the host computer and the like, and, by communication between the protocol chip and the micro processor, it is able to complete one process related to these commands (for example, it is able to complete pre-processing for main processing such as writing or reading data to or from the storage device).

When the above described data pre-fetching technique in the publication is applied to this type of data storage device, since the number of transactions for the protocol chip or the microprocessor must be unnecessarily increased, the time period which is required for the above described series of processes becomes undesirably long. As a result, the throughput of the storage system is undesirably deteriorated.

Accordingly, an object of the present invention is to provide a technique for pre-fetching data from the destination of a request for reading out data for the source of such a read out request, without increasing the number of unnecessary transactions caused by this read-out request.

Other objects of the present invention will become clear from the following explanation.

The storage system according to the present invention is a storage system which can receive and process IO commands from an external device, which is a device that is present externally, and includes: a plurality of storage devices; and a storage control device which communicates with at least one storage device among the plurality of storage devices, according to IO commands from the external device. This storage control device includes: a protocol chip, which receives IO commands from the external device, which has a storage resource, and which is a circuit for controlling sending and receiving of data according to a predetermined protocol; a micro processor which creates parameter information for the protocol chip; a local memory, which is a memory that can be accessed by the micro processor; a bridge circuit which mediates communication between the protocol chip and the micro processor; a first bus which is connected to the protocol chip and to the bridge circuit; and a second bus which is connected to the bridge circuit and to the micro processor. When receiving an IO command from the external device, the protocol chip writes the IO command into the local memory. The microprocessor reads the IO command from the local memory, generates parameter information for the protocol chip, writes the generated parameter information into the local memory, and issues to the protocol chip a write command which includes access destination information, which is information indicating a destination for access to the parameter information, thereby the write command is transferred to the protocol chip via the second bus, the bridge circuit, and the first bus. Due to this, the write command is transferred to the protocol chip via the second bus, the bridge circuit, and the first bus. When receiving the specified write command via the bridge circuit from the micro processor, the protocol chip issues a read command for the access destination which is indicated by the access destination information within the specified write command. Thereby the read command is transferred to the bridge circuit via the first bus. And the bridge circuit has a storage resource, and monitors write commands which are transferred to the protocol chip from the micro processor via itself, and if it is determined, as a result of monitoring, that the write command is a specified write command, pre-fetches the parameter information from the local memory into the storage resource using the access destination information within the write command, and, when receiving a read command for the access destination from the protocol chip, transmits the parameter information which has been pre-fetched to the protocol chip via the first bus, without passing the read command through to the micro processor.

In a first embodiment, in the write command which is issued from the micro processor to the protocol chip, there is included an issue destination address for the write command. And the bridge circuit has a first comparison circuit, and the issue destination address in the write command which passes through the bridge circuit is input by the first comparison circuit, which compares the issue destination address which has been input and a predetermined address, and if a match is obtained, the bridge circuit pre-fetches the parameter information from the local memory into the storage resource, using the access destination information within the write command.

In a second embodiment, the bridge circuit has a second comparison circuit. And the bridge circuit stores access destination information within the write command in the storage resource, and pre-fetches parameter information from the local memory into the storage resource in correspondence with the access destination information. Moreover, when receiving a read command from the protocol chip, the bridge circuit inputs the access information within the read command and compares this access destination information which has been input and the access destination information which is stored in the storage resource by means of the second comparison circuit, and transmits parameter information which is in correspondence with matching access destination information via the first bus to the protocol chip.

In a third embodiment, in the second embodiment, the bridge circuit establishes a correspondence, in the storage resource, of state information which indicates the pre-fetch state with the access destination information, and makes the state information be "not pre-fetched" at that time. And, when acquiring the parameter information from the local memory, the bridge circuit pre-fetches the parameter information into the storage resource in correspondence with the access destination information; and, in this case, updates the state information which is in correspondence with the access destination information to "pre-fetch available. Moreover, when receiving a read command from the protocol chip, the bridge circuit makes the subject of comparison with the access destination information which has been input into the second comparison circuit be access destination information for which the state information is "pre-fetch available".

In a fourth embodiment, in the third embodiment, "being pre-fetched" is additionally included in the state information. And the bridge circuit: when a read command for pre-fetching the parameter information has been issued to the micro processor using certain access destination information, updates the state information which is in correspondence with the access destination information to "being pre-fetched. Moreover, when receiving a read command from the protocol chip, the bridge circuit makes the subject of comparison with the access destination information which has been input into the second comparison circuit be access destination information for which the state information is "pre-fetch available" and "being pre-fetched"; and, if the state information which corresponds to the access destination information for which a match is obtained is "being pre-fetched", waits until the pre-fetching of the parameter information is completed, and when the pre-fetching is completed, transmits the pre-fetched parameter information to the protocol chip in response to the read command which is received.

In a fifth embodiment, when writing into the local memory a plurality of items of parameter information, the micro processor writes into the local memory also additional information which indicates the location of the next item of parameter information for each item of parameter information, and includes, in the write command which is transmitted via the bridge circuit to the protocol chip, a plurality of items of access destination information which respectively correspond to the plurality of items of parameter information. And when receiving a write command in which the plurality of items of access destination information are included, the protocol chip issues read commands a plurality of times, respectively corresponding to the plurality of items of access destination information. Moreover, the bridge circuit, using the initial access destination information from the write command which is transmitted via itself, acquires one item of parameter information and also additional information thereof from the local memory, and if the additional information indicates that a next item of parameter information is present, acquires the next item of parameter information using the additional information. And issuing by the protocol chip of a read command for reading the parameter information, and sending by the micro processor of the next and subsequent items of parameter information to the bridge circuit, are performed independently.

In a sixth embodiment, when writing into the local memory parameter information which forms a parameter chain made up of a plurality of parameters, the micro processor writes into the local memory also additional information which indicates the location of the next parameter for each parameter, and includes, in the write command which is transmitted via the bridge circuit to the protocol chip, a plurality of items of access destination information which respectively correspond to the plurality of parameters. And when receiving a write command in which the plurality of items of access destination information are included, the protocol chip issues read commands a plurality of times, respectively corresponding to the plurality of items of access destination information. Moreover, the bridge circuit, using the initial access destination information from the write command which is transmitted via itself, acquires one item of parameter information and also additional information thereof from the local memory, and if a next parameter is specified from the additional information, acquires the next parameter using the additional information. And, issuing by the protocol chip of a read command for reading the parameter information, and sending by the micro processor of the next and subsequent items of parameter information to the bridge circuit, are performed independently.

In the fifth or the sixth embodiment, the micro processor, when it has written a portion of the parameter information, may also issue a write command to the protocol chip.

In a seventh embodiment, the storage control device may comprise: a cache memory which can temporarily store data sent and received between the external device and the plurality of storage devices; a plurality of first interface circuits which control data transfer between the external device and the cache memory; a plurality of second interface circuits which control data transfer between the cache memory and the plurality of storage devices; and a connection unit which mutually connects together the plurality of first interface circuits, the plurality of second interface circuits, and the cache memory. In this case, the protocol chip, the micro processor, the bridge circuit, the first bus, and the second bus may be provided to at least one among the plurality of first interface circuits.

In an eighth embodiment, the bridge circuit may mediate, not only communication between the protocol chip and the micro processor, but also communication between the micro processor and the cache memory which can temporarily store data which is sent and received between the external device and the plurality of storage devices.

And the control device according to the present invention includes a first processing unit (for example, a hardware circuit), a second processing unit (for example, a microprocessor), a memory, a bridge circuit (a hardware circuit) which mediates communication between the first processing unit and the second processing unit, a first bus which is connected to the first processing unit and the bridge circuit, and a second bus which is connected to the bridge circuit and the second processing unit. When receiving an IO command from the external device, the first processing unit writes the IO command into the memory. The second processing unit reads the IO command from the memory, generates parameter information for the first processing unit, writes the generated parameter information into the memory, and issues to the first processing unit a write command which includes access destination information, which is information indicating a destination for access to the parameter information. Thereby the write command is transferred to the first processing unit via the second bus, the bridge circuit, and the first bus. The bridge circuit has a storage resource, and monitors write commands which are transferred to the first processing unit from the second processing unit via itself, and if it is determined, as-a result of monitoring, that the write command is a specified write command, pre-fetches the parameter information from the memory into the storage resource using the access destination information within the write command. The first processing unit receives the write command via the bridge circuit from the second processing unit, and issues a read command to the access destination which is indicated by the access destination information within the write command. Thereby the read command is transferred to the bridge circuit via the first bus. And when receiving a read command for the access destination from the first processing unit, the bridge circuit transmits the parameter information which has been pre-fetched to the first processing unit via the first bus, without passing the read command through to the second processing unit. This control device can be applied to a storage control device of a storage system, and may be also applied to a control device for other types of computer system (for example, to a control circuit board for a so called blade server or the like).

BRIEF DESCRIPTION OF THE DRAWINGS

FIG. 6 is a figure showing an example of the transfer flow when a pre-fetch function has been provided to the bridge 119;

FIG. 7 is a figure showing a structural example of the bridge 119, and a detailed example of the flow of processing which is performed by the protocol chip 105, the bridge 119, and the MP 10;

FIG. 8 is a figure showing an example of the flow of processing of the bridge 119, up until a pre-fetch is performed;

FIG. 9 is a figure showing an example of the flow of processing of the bridge 119 when it has received a read command from the protocol chip 105;

FIG. 10 is a figure showing an example of processing for writing parameter information which constitutes a parameter chain into a local memory 103;

FIG. 11 is a figure showing an example of the transfer flow in the case of a parameter chain.

DESCRIPTION OF THE PREFERRED EMBODIMENTS

Embodiments of the present invention will now be explained in the following with reference to the drawings.

Figure 1:
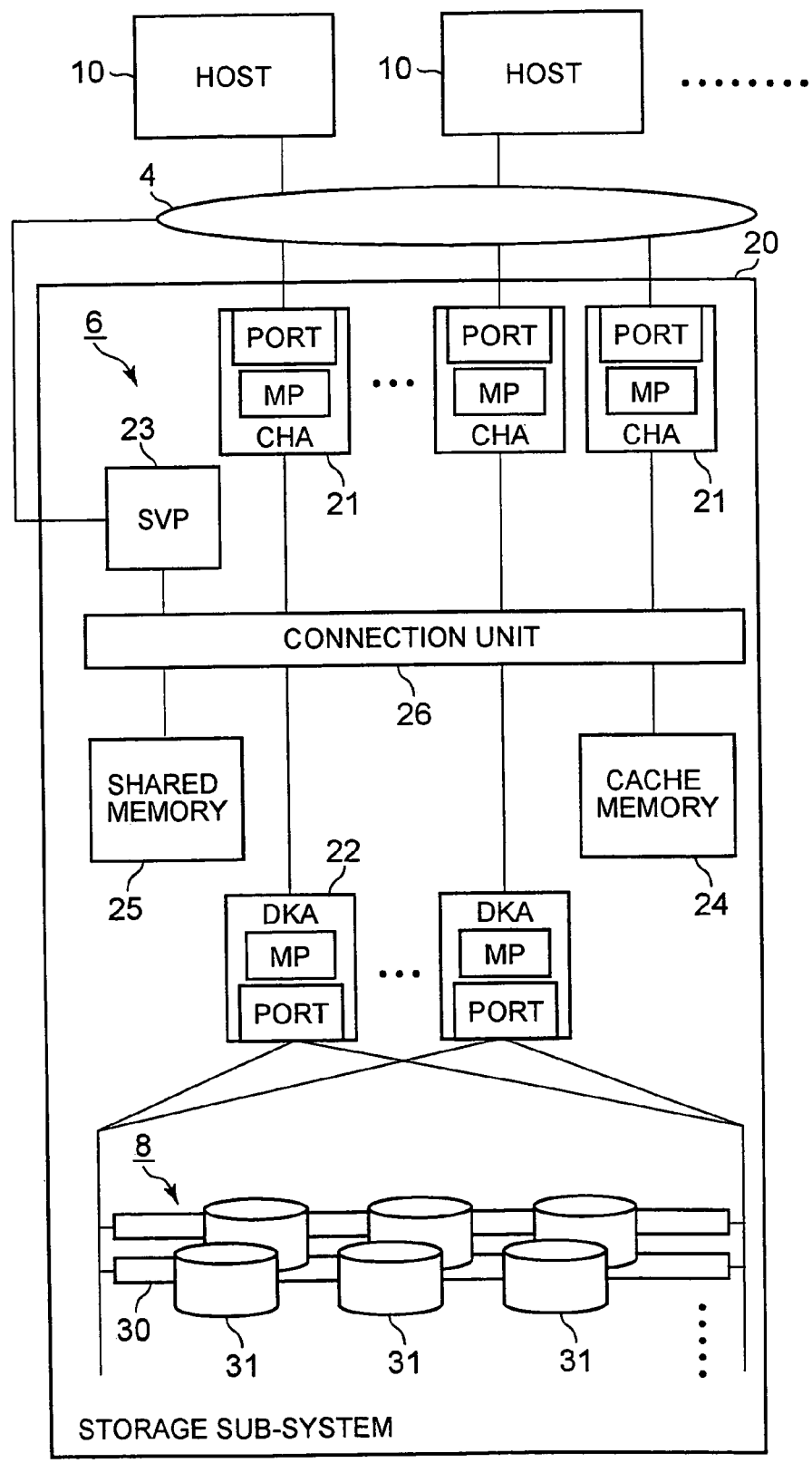
FIG. 1 is a block diagram showing a storage system according to an embodiment of the present invention.

FIG. 1 is a block diagram showing a storage system according to one embodiment of the present invention.

For example host computers 10 and a storage system 20 are connected to a communication network 4. Moreover, various types of network may be employed for this communication network 4, such as, for example, a LAN (Local Area Network), a SAN (Storage Area Network), or a dedicated line or the like.

The host computers 10 are computer devices which comprise information processing resources such as, for example, a CPU (Central Processing Unit), a memory, and the like; for example, they may consist of personal computers, work stations, main frames, or the like. These host computers 10 can issue IO (input/output) commands for requesting reading out of data or writing of data, and various other types of commands, to the storage system 20.

The storage system 20 is a disk array device which comprises, for example, a plurality of disk type storage devices 30 arranged in an array. This storage system 20 may be broadly divided into a storage control device 6 and a storage device section 8.

The storage device section 8 comprises the plurality of disk type storage devices 30. RAID groups (also sometimes termed parity groups or array groups) are constituted by two or more of the plurality of disk type storage devices 30, and one or a plurality of logical storage devices 31 (hereinafter termed LDEVs) are provided based on the physical storage resources of these RAID groups.

The storage control device 6 comprises, for example, a plurality of channel adapters (CHAs) 21, a plurality of disk adapters (DKAs) 22, a service processor (SVP) 23, a cache memory (CM) 24, a shared memory (SM) 25, and a connection unit 26. At least one of the CM 24 and the SM 25 may be provided in plurality.

The CHAs 21 communicate with the host computers 10. The CHAs 21 may be made as circuit boards comprising one or a plurality of communication ports, one or a plurality of micro processors (hereinafter abbreviated as MPs), and memory not shown in the drawings;

The DKAs 22 are devices which perform data transfer to and from the disk type storage devices 30. These DKAs 22 may be made as circuit boards comprising one or a plurality of communication ports, one or a plurality of micro processors, and memory not shown in the drawings.

The SVP 23 is a device for performing maintenance of the storage system 20. This SVP 23, for example, may be a device (for example a personal computer) which comprises an input/output console and a control console, and the control console (for example, a so called motherboard) may be connected to the input/output console (for example a remote management terminal not shown in the drawings).

The CM 24 is a device for temporarily storing data which has been received from a host computer 10, and data which has been read out from the LDEVs 31 or data to be written in the LDEVs 31. Control information and the like is stored in the SM 25. Furthermore, in the SM 25, there are provided a work region in which can be stored messages exchanged with the MPs, a region in which control information for controlling the storage system 20 is stored, and the like.

The connection unit 26 mutually connects together the CHAs 21, the DKAs 22, the cache memory 24, and the shared memory 25. This connection unit 26 may be, for example, constituted as a high speed bus, such as an ultra high speed crossbar switch or the like which performs data transmission by high speed switching operation.

With this storage system 20, when a write command has been received from a host computer 10, a CHA 21 writes the data according to this write command into the CM 24, and a DKA 22 can read this data from the CM 24 and write this data into a LDEV 31. On the other hand, when a read command has been received from a host computer 10, a DKA 22 is requested to read in the data according to this read command, and, according to this request, the DKA 22 reads in the data from a LDEV 31 and writes it into the CM 24, and a CHA 21 can read out this data from the CM 24 and can transmit it to the host computer 10.

The above is an example of the structure of a storage system 1 according to this embodiment. It should be understood that the above described explanation is an example, and a different structure may be employed. For example, the shared memory 25 and the cache memory 24 may not be separate memories; it would be acceptable to provide a shared memory region and a cache memory region within a single memory. Furthermore, for example, it would also be acceptable for the storage control device 6 to be a circuit board on which are provided a CPU, memory, and communication ports. In this case, the CPU would be able to execute the procedures performed by the pluralities of CHAs and DKAs. Furthermore, the opposite parties to communication by the CHAs 21 might be various types of external device, such as external storage systems or the like, instead of the host computers 10.

Figure 2:
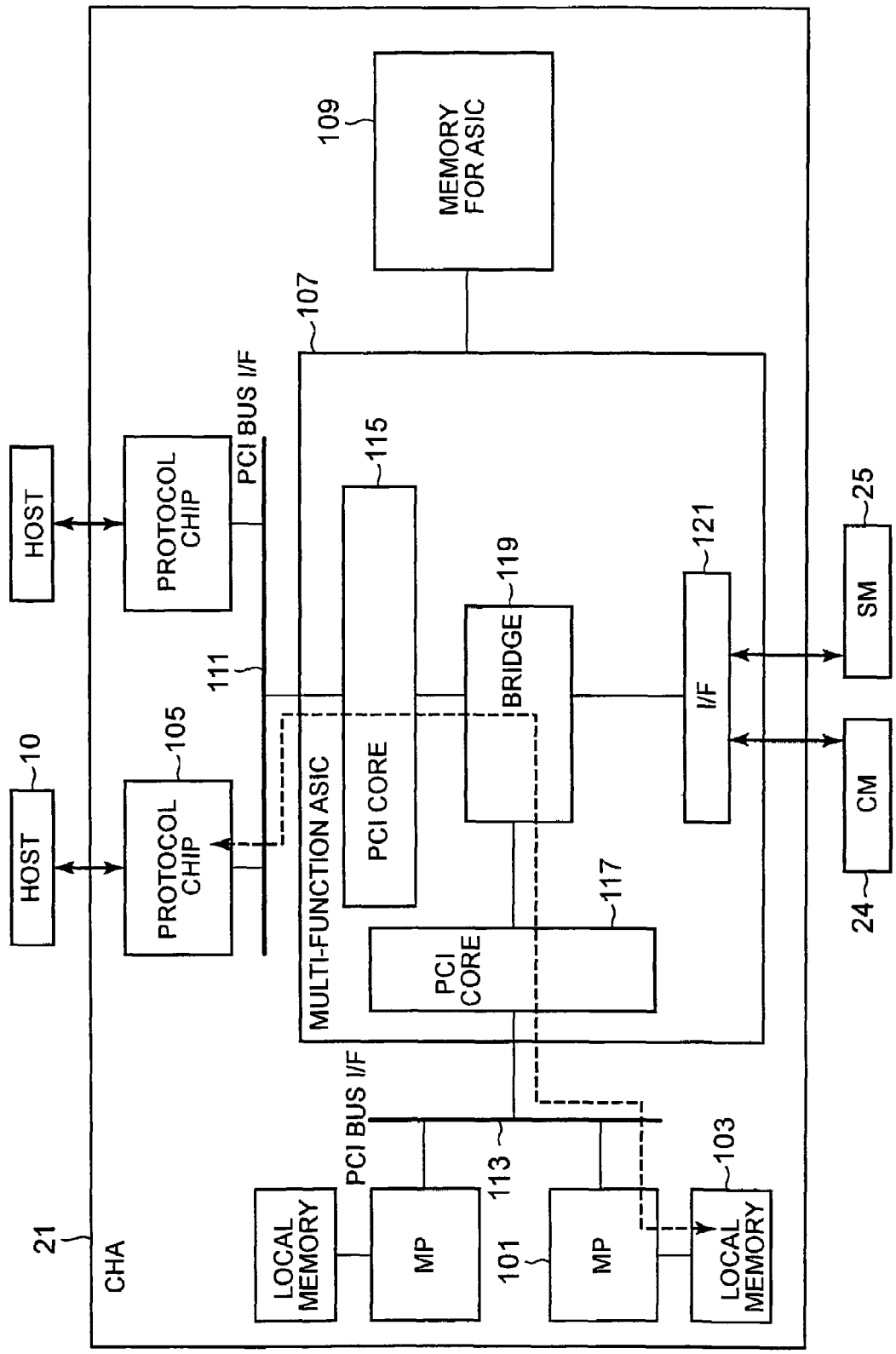
FIG. 2 is a figure showing an example of the structure of a CHA 21.

FIG. 2 shows an example of the structure of one of the CHAs 21.

This CHA 21 comprises circuits 105 (hereinafter termed protocol chips) for receiving IO commands from the host computers 10 and controlling sending and receiving of data according to a predetermined protocol (for example a fibre channel standard protocol), a hardware circuit 107 (hereinafter termed a multi-function ASIC (Application Specific Integrated Circuit)) which is endowed with a plurality of functions, a memory 109 for the ASIC, which is a memory which is used by the multi-function ASIC, one or a plurality of MPs 101, and local memories 103, which are memories used by the MPs 101.

The protocol chips 105 (for example ICs (Integrated Circuits)) and the multi-function ASIC 107 are connected to a first bus 111, and the MPs 101 and the multi-function ASIC 17 are connected to a second bus 113. These buses may be made as PCI (Peripheral Component Interconnection) or PCI-X buses.

The multi-function ASIC 107 comprises, for example, a first PCI core 115, a bridge 119 which is a LSI (Large Scale Integration) which controls data transfer, an interface circuit (I/F) 121 for accessing the CM 24 or the SM 25 via the connection unit 26, and a second PCI core 117. The first PCI core 115 performs the conversion of the format of information from the first bus 111 to the information format used by the bridge 119 and outputting of it to the bridge 119, and also performs the conversion of the format of information from the bridge 119 to the information format used by the first bus 111 and outputting of it. In the same manner, the second PCI core 117 performs the conversion of the format of information from the second bus 113 to the information format used by the bridge 119 and outputting of it to the bridge 119, and also performs the conversion of the format of information from the bridge 119 to the information format used by the second bus 113 and outputting of it.

Data exchanged between the host computers 10 and the LDEVs 31 is temporarily stored in the memory 109 for the ASIC. As previously described, the multi-function ASIC 107 is endowed with a plurality of functions. In concrete terms, the bridge 119 of this multi-function ASIC 107 is not limited to performing data transfer between the protocol chips 105 and the MPs 101; for example, it may transfer control commands from the MPs 101 to the SM 25, and may transfer data stored in the memory 109 for the ASIC to the CM 24.

When a protocol chip 105 receives a command from a host computer 10, as shown by the dashed line, communication is started between the protocol chip 105 and an MP 101, and, due to this, the data in the local memory 103 of this MP 101 is transferred to the protocol chip 105. This communication between the protocol chip 105 and the MP 101 passes via a plurality of buses, i.e. both the first bus 111 and the second bus 113.

In this embodiment, by undertaking measures in the bridge 119 which will be subsequently described in detail, the length of the time period for communication between the protocol chip 105 and the MP 101 which is started when the protocol chip 105 has received a command from the host computer 10 is shortened, and, consequently, the processing according to this command (for example, pre-processing, which is processing before the main processing of writing of data to a LDEV 31, or reading in of data from a LDEV 31, according to an IO command) can be completed quickly. At this time, there is no requirement to increase unnecessarily the number of transactions for the protocol chip 105 which is the source of the request for reading out data. This point will be explained in detail below. It should be understood that, in the following explanation, the command from the host computer 10 is supposed to be an IO command.

First, in order to make it easy to understand the measures which are undertaken by the bridge 119, an example of the transfer flow between the protocol chip 105 and the MP 101 when no measures at all are undertaken by the bridge 119 will be explained.

Figure 3:
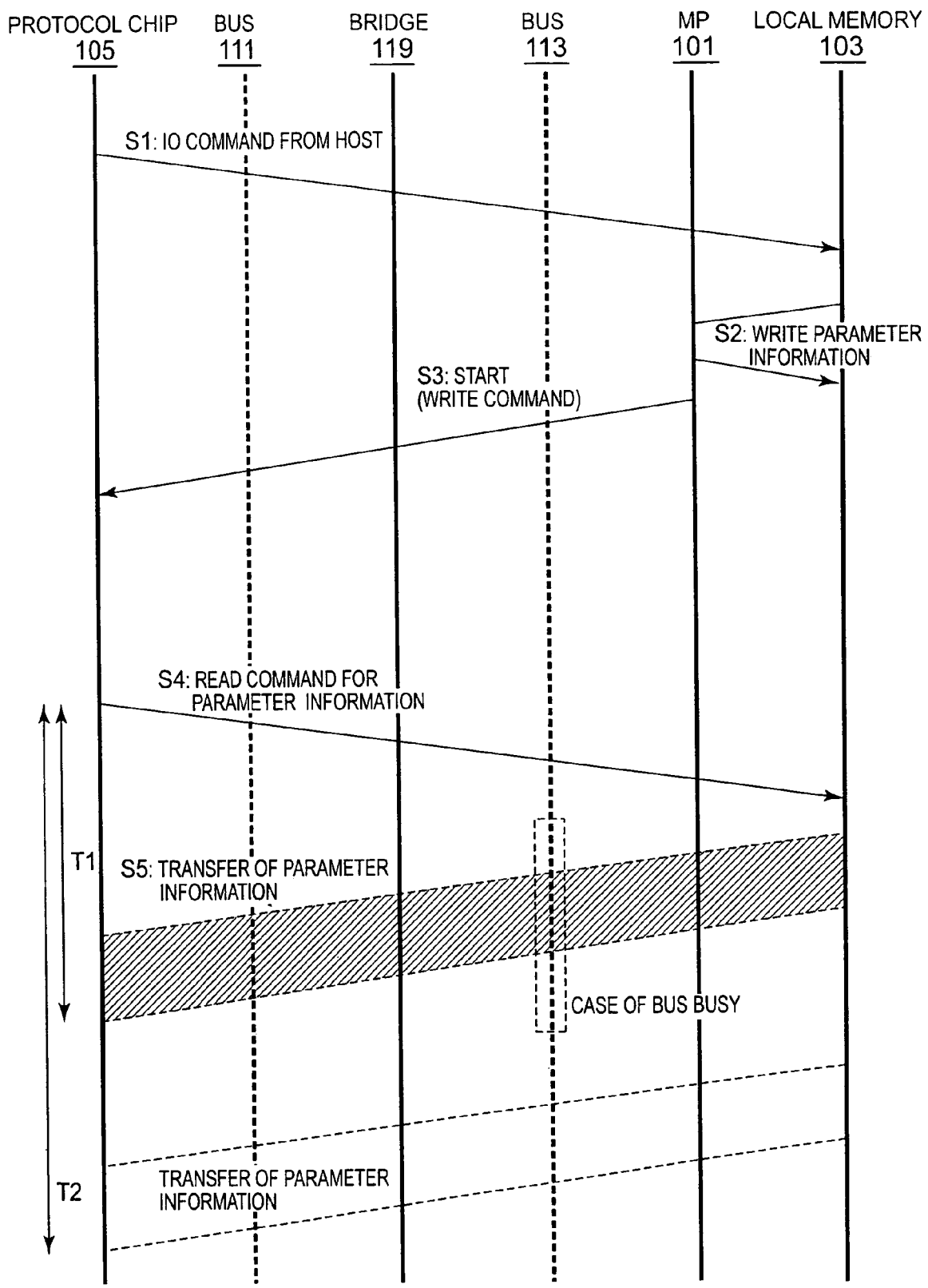
FIG. 3 is a figure showing an example of transfer flow, when no measures are undertaken by a bridge 119.

FIG. 3 shows an example of the transfer flow when no measures are undertaken by the bridge 119.

The protocol chip 105 writes the IO command from the host computer 10 into a desired address, or a predetermined address, of the local memory 103 (in a step S1). In concrete terms, it generates a write command for writing this IO command into the local memory 103, and, due to this, the write command arrives at the MP 101 via the first bus 111, the multi-function ASIC 107, and the second bus 113, and the above described IO command, which is the write subject data according to this write command, is written into the local memory 103 by the MP 101.

Figure 4:
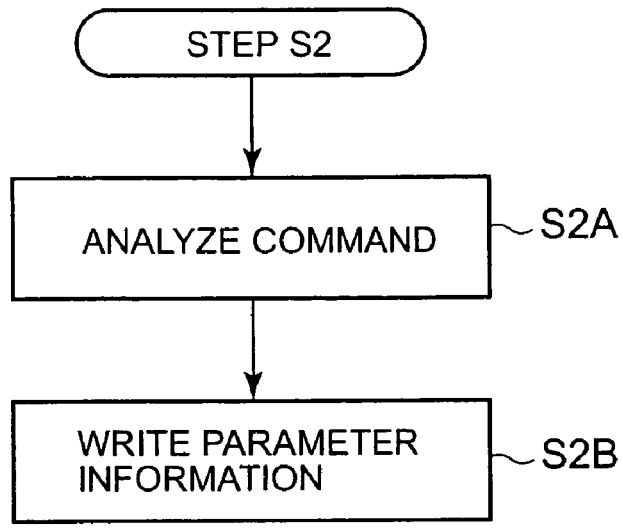
FIG. 4 is a figure showing an example of the flow of processing of an MP 101, when an IO command has been received.

The MP 101 acquires the IO command which has been written into the local memory 130, and writes (in a step S2) whether, in this case, it has one or a plurality of parameters (hereinafter termed the "parameter information") into a desired address, or a predetermined address, of the local memory 103. In concrete terms, as for example shown in FIG. 4, the MP 101 analyzes (in a step S2A) the IO command which is in the local memory 103, and generates the parameter information (the parameter information for the protocol chip 105) based on the result of this analysis, and writes it into the local memory 103 (in a step S2B).

And the MP 101 starts the protocol chip 105 (in a step S3). In concrete terms, the MP 101 issues a write command including information which indicates the destination address for writing the parameter information (hereinafter, the "address information") to a predetermined address (or a desired address) of the storage resources which the protocol chip 105 has. Instead of the address information, there may be included information about a different type of destination for access, such as a pointer to a place in which the parameter information is written, or the like (in this case, more exchanges may be performed than in the example shown in the figure).

The protocol chip 105 issues (in a step S4) a read command for the address which is indicated by the address information included in the write command which it has received as a start command. And the MP 101, in response to this read command, transfers (in a step S5) the parameter information which is stored in its local memory 103 to the protocol chip 105.

If, for example, the second bus 113 is busy at this time, then the MP 101 transfers the parameter information which is stored in its local memory 103 to the protocol chip 105 after a certain amount of time has elapsed.

Figure 5:
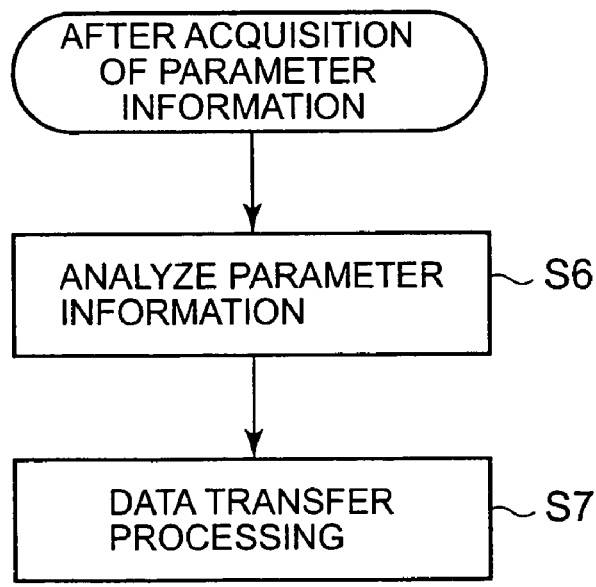
FIG. 5 is a figure showing an example of the flow of processing of a protocol chip 105, when parameter information has been acquired.

Furthermore, when the protocol chip 105 has acquired the parameter information for the IO command from the host computer 10, as shown in the example of FIG. 5, it analyzes this parameter information (in a step S6), and is able to perform data transfer processing (in a step S7) based on the result of this analysis. In concrete terms, for example, for the various parameters within the parameter information, there may be an address (for example, an address in the memory 109 for the ASIC), the length of the data transfer, and information indicating the direction of the transfer of data (for example, whether the IO command is a write command or a read command); and, in the data transfer processing, according to each of the parameters, for example, processing may be performed for transferring data which is stored in the memory 109 for the ASIC to the CM 24, or processing may be performed for transferring data which is stored in the memory 109 for the ASIC to the host computer 10.

According to the transfer flow shown as an example in FIG. 3, if a read command for reading out parameter information has been issued from the protocol chip 105, this read command arrives via the plurality of buses in order, i.e. via the first bus 111 and then the second bus 113, to the MP 101, and, when the parameter information has been read out from the local memory 103, then this parameter information arrives via the plurality of buses in order, i.e. via the second bus 113 and then the first bus 111, to the protocol chip 105. In other words, after a start command has reached the protocol chip 105, an exchange is performed between the protocol chip 105 and the MP 101 via the plurality of buses and the bridge 119. As a result, a time period T1 of a certain length (for example two microseconds) is taken from when the protocol chip 105 issues the read command for the parameter information until the protocol chip 105 receives the parameter information according thereto; and, if the second bus 113 has been in a busy state, the time period T2 which is taken—for example, six microseconds—may be longer than this time period T1.

Thus, in this embodiment, a memory not shown in the figures (hereinafter termed a bridge memory) and a pre-fetch function for the parameter information are provided to the bridge 119. The bridge 119 reads in the parameter information in advance from the local memory 103 into the bridge memory, in parallel with the start command to the protocol chip 105. And, when it has received a read command from the protocol chip 105 for the parameter information, the bridge 119 returns this parameter information which is stored in the bridge memory. Since, due to this, it is possible to deduct the bus traffic for the read command for the parameter information and for the parameter information which is transmitted in response thereto as compared to the case of FIG. 3, accordingly it is possible to anticipate a reduction of the length of the time period required for communication. Furthermore, it is possible to implement this while causing absolutely no particular addition to the transactions by the protocol chip 105 which requests the parameter information. This will be explained below in detail.

FIG. 6 shows an example of the transfer flow when such a pre-fetch function is provided to the bridge 119.

The steps S11 through S13 in this figure are the same as the steps S1 through S3 of FIG. 3.

The bridge 119 monitors (in a step S14) write commands which pass the bridge 119, and if, for example, the issue destination address of such a write command is a predetermined address in the storage resources of the protocol chip 105 (an address for start commands), then it decides that this write command is a start command.

And the bridge 119 specifies an address in the local memory 103 from this write command, and issues a read command to that address (in a step S15) to pre-fetch the parameter information. By doing this, the parameter information is acquired (in a step S16), and the bridge 119 temporarily stores this parameter information which it has acquired in the bridge memory.

On receipt of the start command, the protocol chip 105 issues (in a step S17) a read command for the parameter information to the address which is given by the address information in this start command. And, if the parameter information which is at this address (in other words, the parameter information according to the read command) is already pre-fetched from this address into the bridge memory, then the bridge 119 transfers this parameter information to the protocol chip 105 (in a step S18), without passing through this read command which it has received.

In this manner, according to the pre-fetch function with which the bridge 119 is equipped, it is possible to perform the bus transfers of the read command for the parameter information and of the parameter information which is transferred in response thereto both at one time, which is different from the case explained above with reference to FIG. 3. As a result, it is possible to make the time period T3 from when the read command for the parameter information is issued until when the protocol chip 105 receives the parameter information according thereto to be shorter (for example one microsecond) than the time period T1 in the case of FIG. 3. Furthermore, it is possible to implement this without particularly imposing any further transactions at all on the protocol chip 105 which requests the parameter information.

In the following, the bridge 119 will be explained in greater detail.

FIG. 7 shows a detailed example of the flow of processing which is performed by the protocol chip 105, the bridge 119, and the MP 10. And FIG. 8 shows an example of the flow of processing of the bridge 119, up until the pre-fetch is performed. Moreover, FIG. 9 shows an example of the flow of processing of the bridge 119 when it has received a read command from the protocol chip 105.

The bridge 119 comprises a pre-fetch control unit 201 which controls whether or not pre-fetching is performed, and the like. This pre-fetch control unit 201 comprises a first comparison circuit 203, a bridge memory 205, and a second comparison circuit 207.

For example, an issue destination address for the write command and address information may be included in the write command as a start command from the MP 101 to the protocol chip 105. The issue destination address may be, for example, a predetermined address in the storage resource of the protocol chip 105. The address information is, in this embodiment, information which indicates an address in the local memory 103, which is the address in which the parameter information is stored. It would also be acceptable for it to be some other type of access destination information instead of address information, such as a pointer to the address of the parameter information, or the like.

The bridge 119 monitors the write commands from the MP 101 (in a step S101 of FIG. 8). In concrete terms, when a write command has been issued from the MP 101 via the bridge 119 to the protocol chip 105 (in steps S51 of FIG. 7 and S103 of FIG. 8), the issue destination address of this write command is input into the first comparison circuit 203 (in a step S52 of FIG. 7). The first comparison circuit 203 compares the pre-determined address and the issue destination address (in a step S53). If the result is that these two do not agree with one another, then the pre-fetch control unit 201 does not perform any pre-fetching; while, if they do agree with one another, then it performs a step S54 of FIG. 7 and steps S104 through S106 of FIG. 8. In other words, the pre-fetch control unit 201 writes (in the step S104 of FIG. 8) the address information in the write command into the bridge memory 205 (for example, a buffer), analyzes this address information (in the step S105 of FIG. 8), and issues a read command for pre-fetching to the address which is indicated in this address information (in the step S106 of FIG. 8). If pre-fetching is currently being performed for address information which was written in the past, then it waits until the pre-fetch for the address information which was written in the step S54 is performed.

For each item of address information, its pre-fetch state and the parameter information which has been read out from the address which is indicated by its address information may be stored in the bridge memory 205 in correspondence with one another. By its pre-fetch state is meant information which indicates the state of progress of the pre-fetch processing; for example, it is possible to indicate whether it is "effective" or "invalid" (pre-fetch completed or not) with one bit, and it is possible to indicate whether it is "effective", "being pre-fetched", or "invalid" with a plurality of bits. The pre-fetch state is cancelled by the bridge memory 205 directly after the address information has been written, and, if the parameter information from the address indicated by this address information has been acquired and stored in the bridge memory 205, the pre-fetch state is changed from "invalid" to "effective". It would also be acceptable to change the pre-fetch state from "invalid" to "being pre-fetched", if the read command for pre-fetching has been issued.

If, due the step S54 of FIG. 7 (S106 of FIG. 8), the parameter information according to the read command has been sent from the local memory 103 via the MP 101 and has arrived (the step S107 of FIG. 8), the pre-fetch control unit 101 puts this parameter information into correspondence (in the steps S55 of FIG. 7 and S108 of FIG. 8) in the bridge memory 205 with the address information which was written in the step S54 (or, to put it in another manner, with the address information which indicates the issue destination address of the read command which was issued in the step S54). And the pre-fetch control unit 101 makes the pre-fetch state which corresponds to this address information "effective" (in the step S109 of FIG. 8).

Moreover, in the storage resource of the protocol chip 105, data according to the write command from the MP 101 is written into the issue destination address of this write command. If the address in which this data has been written is a predetermined address, the protocol chip 105 issues a read command for the address which is indicated by the address information in this write command (in the steps S61 of FIG. 7 and S211 of FIG. 9), while, if it is not, the protocol chip 105 performs nothing, or some predetermined processing.

The second comparison circuit 207 of the pre-fetch control unit 201 compares together (in the steps S62 of FIG. 7 and S212 of FIG. 9) the issue destination address of the read command from the protocol chip 105 and each of the addresses indicated by each of the address information items for which, in the bridge memory 205, the pre-fetch state is "effective" (and "being pre-fetched"). If the result of this comparison is that there is a match, then the pre-fetch control unit 201 stops this read command and does not pass it through, and reads out the parameter information corresponding to the address information which has thus agreed from the bridge memory 205 and transmits it to the protocol chip 105 (in the steps S63 of FIG. 7 and S213 of FIG. 9). If in the step S62 of FIG. 7 (and the step S212 of FIG. 9) the match has been with an item whose address information pre-fetch state is "being pre-fetched", then the pre-fetch control unit 201 waits until the parameter information is acquired, and transmits this parameter information to the protocol chip 105 when it has been acquired. When the parameter information has been transmitted, the pre-fetch control unit 201 may delete the parameter information which has been transmitted and the information corresponding thereto (the pre-fetch state and the address information) from the bridge memory 205 at a pre-determined timing (for example, directly thereafter)

If the result of the comparison in the step S62 of FIG. 7 (S212 of FIG. 9) is that there is no match, then the pre-fetch control unit 201 passes through the read command to the MP 101 (in the steps S64 of FIG. 7 and S214 of FIG. 9). Due to this, the parameter information is read out by the MP 101 according to this read command, and the parameter information which has thus been read out is transferred to the protocol chip 105 via the bridge 119 (in a step S65).

The above is an example of the structure of the bridge 119, and an example of the flow of processing which is performed by the bridge 119.

According to the above described explanation, it is possible for the bus transfers for the read command for the parameter information, and for the parameter information which is transferred in response thereto, to be performed at one time by the bridge 119 which is endowed with this pre-fetch function, which is different from the case which was explained with reference to FIG. 3. As a result, it is possible to shorten the length of the time period from when the read command for the parameter information is issued, until the protocol chip 105 receives the parameter information corresponding thereto. Furthermore, it is possible to implement this while causing absolutely no particular addition to the transactions by the protocol chip 105 which requests the parameter information.

In particular, since the hardware circuit in which the bridge 119 is included is the multi-function ASIC 107, the bus is not only employed for communication between the MP 101 and the protocol chip 105, but it is necessary, for example, for communication between the MP 101 and the ASIC 107, for access to the memory 109 for the ASIC, the CM 24, the SM 25 by direct memory access transfer, and so on, and for various types of communication. Due to this, an increase in the efficiency of utilization of the bus for pre-fetching which is capable of performing transfer in the empty time of the bus does not only simply shorten the length of the time period for transfer between the protocol chip 105 and the MP 101, but also is effective from the point of view of enhancing the overall throughput of the storage system 20.

By the way, even if the situation is one in which a single set of parameter information is continually being written from a certain address in the local memory 103, (A) the case occurs in which additional information is written corresponding to several items of parameter information, so that it is possible to read out a plurality of items of parameter information with a single read command; and (B) the case occurs in which a parameter chain which constitutes a single item of parameter information is being written. In case (B), in concrete terms, for example, if the parameter information consists of a chain of parameters 1 to 3, as shown in the example of FIG. 10, the MP 101 writes the parameter #1, and additional information of 0 s written into all the digits at the tail end of the parameter #1 (in the step S701). Next, this additional information is updated to information indicating the position of the parameter #2, and the parameter #2 is written, while additional information of 0 is written into all the digits at the tail end of the parameter #2 (in the step S702). Finally, this additional information is updated to information indicating the position of the parameter #3, and the parameter #3 is written, while additional information which indicates that this parameter #3 is the last one in this parameter chain (for example, additional information of 0 in all of its digits) is written into the tail end of the parameter #3 (in the step S703). In each of these parameters, for example, there may be included an address (for example, an address in the memory 109 for the ASIC), a length for the data transfer, and information which indicates the direction of the data transfer (for example, whether the IO command is a write command or a read command). It should be understood that this flow example may the used in the same manner in the case (A).

In the cases (A) and (B), n read commands are required for reading each of n items of parameter information or parameters (where n is an integer greater than or equal to two). For example, in the case (B), as shown in the example of FIG. 10, three read commands are required in the case of a chain of three parameters 1 to 3. Due to this, when no particular measures are implemented in the bridge 119, the communication time period due to the two bus transfers becomes longer in proportion to the number n of read commands to be issued. Accordingly, the communication time periods for the two bus transfers exert a great influence on the lengths of the time periods which are required for processing of commands from the host computers 10.

Thus when, in this embodiment, the bridge 119 performs pre-fetching of a parameter which is included in the parameter information, it also reads the additional information for this parameter and analyzes this additional information, and, if this information has specified that a next parameter is present, it performs pre-fetching of the next parameter. In the following, among the above described cases (A) and (B), the explanation will consider the case of (B). At this time, the explanation of portions which are common to portions which have already been explained above will be curtailed or omitted, and the explanation will focus on the points of difference.

FIG. 11 shows an example of the transfer flow in the case of a parameter chain. And FIG. 12 shows an example of the flow of processing in the bridge 119.

The protocol chip 105 writes the IO command from the host computer 10 into any desired address, or a predetermined address, of the local memory 103 (in the step S311 of FIG. 11).

Figure 12:
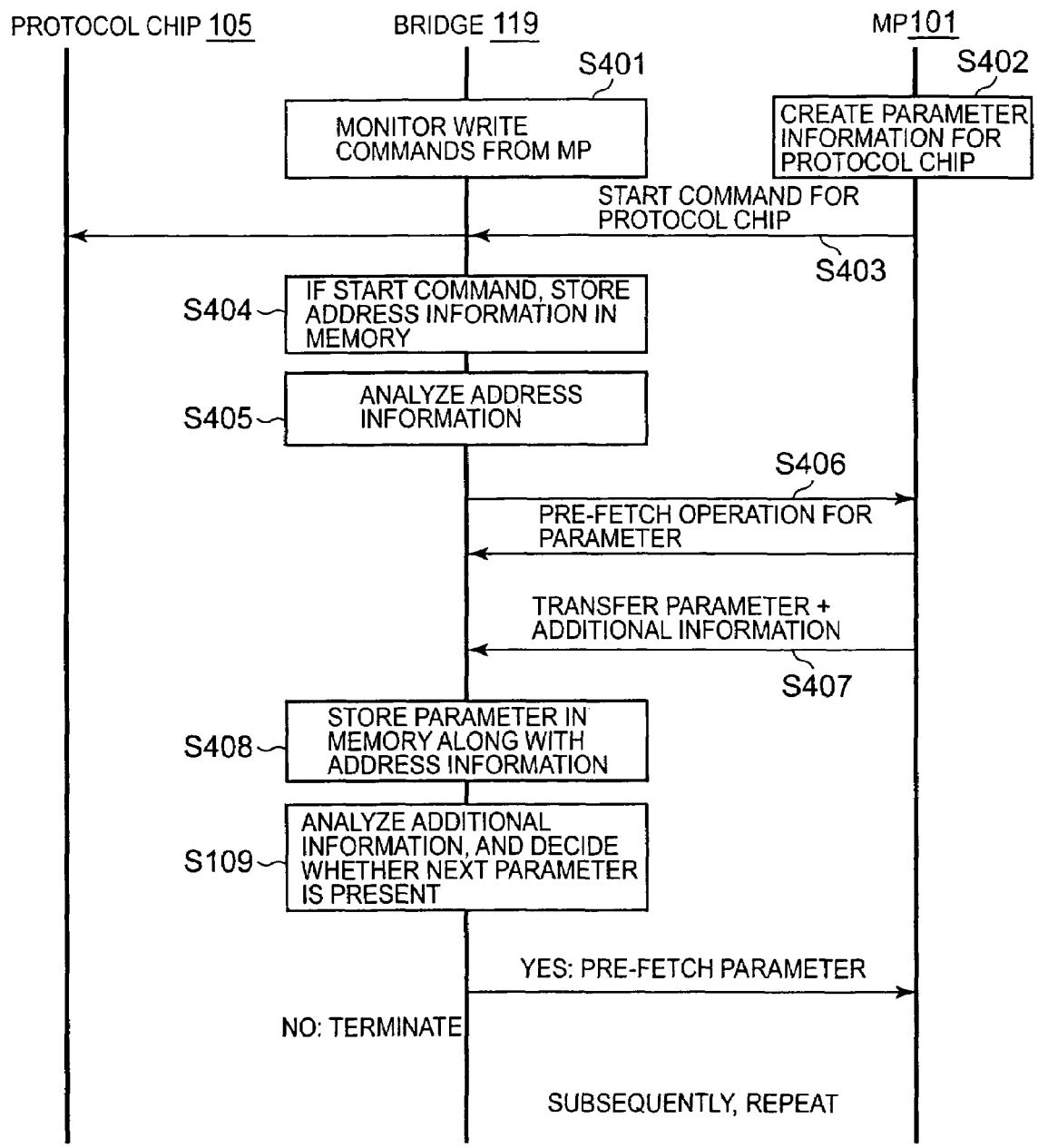
FIG. 12 is a figure showing an example of the flow of processing of the bridge 119.

The MP 101 acquires the IO command from the host computer 10 by referring to any desired address, or a predetermined address, in the local memory 130, and creates the parameter information and writes it in the local memory 10 (in steps S312 of FIG. 11 and S402 of FIG. 12). Since, at this time, there is a parameter chain, the MP 101 writes a plurality of sets of the parameters and their additional information (hereinafter termed a "parameter set") into the local memory 103. It is not necessary for each one of all of the parameter sets in the local memory 103 to be empty.

And the MP 101 issues a write command which includes a plurality of items of address information indicating the write destination addresses for each of the plurality of parameters in the parameter set to a predetermined address (or any desired address) in the storage resource of the protocol chip 105 (in steps S313 of FIG. 11 and S403 of FIG. 12).

The bridge 119 writes the plurality of items of address information in the write command which it has passed through itself into the bridge memory 205 (in a step S404 of FIG. 12), analyzes the beginning address information (in a step S405 of FIG. 12), and issues a read command for the address indicated by this address information (in steps S315 of FIG. 11 and S406 of FIG. 12). By doing this, the parameter set of the parameters and the additional information is received in the bridge 119 from the local memory 103 via the MP 101 (in steps S316 of FIG. 11 and S407 of FIG. 12). The bridge 119 establishes a correspondence between the parameters within this parameter set and the above described beginning address information in the bridge memory 205 (in a step S408), analyzes the additional information in the parameter set which it has received, and decides whether or not a next parameter is present (in a step S409 of FIG. 12). If it has decided that a next parameter is indeed present, the bridge 119 repeats the step S405 of FIG. 12 for the next item of address information (for example, the steps S315' and S316' of FIG. 11). If, on the other hand, it has decided that no next parameter is present (for example, if all of the digits which make up the additional information are 0), then the pre-fetch operation is terminated.

When it receives a start command, the protocol chip 105 issues a parameter read command for the address indicated by the beginning address information in this start command (in a step S317 of FIG. 11). And, if the parameter which is at this address is already pre-fetched into the bridge memory from this address, the bridge 119 does not pass through this read command on receipt thereof, but rather transfers this parameter to the protocol chip 105 (in a step S318 of FIG. 11). The protocol chip 105 analyzes this parameter which it has received, and performs data transfer based on the result of this analysis. Next, if there is further address information within the above described start command which it has received, the protocol chip 105 issues a read command for the address indicated by this address information (in the step S317'). By doing this, the step S318' is performed.

According to the above described explanation, in both the above explained cases (A) and (B), it is possible to perform the bus transfers for transferring the read command for the parameter information or parameters and the transfer in response thereto at one and the same time. It should be understood that although, according to the above described explanation, the transfer of additional information other than the parameter information or parameters, and the analysis of the information added thereto, were performed, the beneficial effect for shortening of the time period obtained by reducing the number of bus transfers is greater.

Furthermore, according to the above described explanation, while the protocol chip 105 is performing the processing for reading the parameter information or the parameters (for example, during the steps S317 and S318), it is possible to perform pre-fetching processing for other parameter information or for other parameters (for example, the steps S317' and S318' may be performed). Due to this, even if, due to n items of parameter information or parameters being present, n read commands are issued, it is possible to prevent the length of the overall processing time period from becoming n times as long, which would be most undesirable.

Although the present invention has been explained above in terms of a preferred embodiment thereof, this is only an example for explanation of the present invention, and the scope of the present invention is not to be considered as being limited only to this embodiment. The present invention may be implemented in various different manners.

For example, in at least one of the above described cases (A) and (B), the MP 101 may issue the write command as the start command, before finishing the writing of all the parameter information or the parameters into the local memory 103. And, since the protocol chip 105 performs the analysis of this parameter information or parameters, and executes processing based on the results of this analysis, when it has acquired the parameter information or the parameters, accordingly it is considered that a state of affairs such as one in which the reading out by the protocol chip 105 is performed before the parameter information or the parameters are written in the local memory 103, which would be undesirable, will not occur.

Furthermore if, for example, the region for pre-fetching in the bridge memory 205 becomes full, it may be arranged for the bridge control unit 201 not to perform pre-fetching even if a match is found in the step S53 of FIG. 7, and the address information written in the step S54 of FIG. 7 may be over-written over the oldest address information.

What is claimed is:

1. A storage system which can receive and process IO commands from an external device, which is a device that is present externally, comprising:
   a plurality of storage devices; and
   a storage control device which communicates with at least one storage device among said plurality of storage devices, according to IO commands from said external device,
   wherein said storage control device comprises:
   a protocol chip, which receives IO commands from said external device, which has a storage resource, and which is a circuit for controlling sending and receiving of data according to a predetermined protocol;
   a micro processor which creates parameter information for said protocol chip;
   a local memory, which is a memory that can be accessed by said micro processor;
   a bridge circuit which mediates communication between said protocol chip and said micro processor;
   a first bus which is connected to said protocol chip and to said bridge circuit; and
   a second bus which is connected to said bridge circuit and to said micro processor,
   wherein when receiving an IO command from said external device, said protocol chip writes said IO command into said local memory,
   wherein said micro processor reads said IO command from said local memory, generates parameter information for said protocol chip, writes said generated parameter information into said local memory, and issues to said protocol chip a write command which includes access destination information, which is information indicating a destination for access to said parameter information, thereby said write command is transferred to said protocol chip via said second bus, said bridge circuit, and said first bus,
   wherein when receiving said specified write command via said bridge circuit from said micro processor, said protocol chip issues a read command for the access destination which is indicated by said access destination information within said specified write command, thereby said read command is transferred to said bridge circuit via said first bus,
   wherein said bridge circuit has a storage resource, and monitors write commands which are transferred to said protocol chip from said micro processor via itself, and if it is determined, as a result of monitoring, that said write command is a specified write command, pre-fetches said parameter information from said local memory into said storage resource using the access destination information within said write command, and when receiving a read command for said access destination from said protocol chip, transmits said parameter information which has been pre-fetched to said protocol chip via said first bus, without passing said read command through to said micro processor,
   wherein, in said write command which is issued from said micro processor to said protocol chip, there is included an issue destination address for said write command, and
   wherein said bridge circuit has a first comparison circuit, and by means of said first comparison circuit, inputs said issue destination address in said write command which passes through said bridge circuit and compares said issue destination address which has been input and a predetermined address, and if a match is obtained, pre-fetches said parameter information from said local memory into said storage resource, using said access destination information within said write command.

2. The storage system according to claim 1, wherein said bridge circuit has a second comparison circuit, and
   stores access destination information within said write command in said storage resource, and pre-fetches parameter information from said local memory into said storage resource in correspondence with said access destination information; and
   when receiving a read command from said protocol chip, inputs the access information within said read command, and compares this access destination information which has been input and the access destination information which is stored in said storage resource by means of said second comparison circuit, and transmits parameter information which is in correspondence with matching access destination information via said first bus to said protocol chip.

3. The storage system according to claim 2, wherein said bridge circuit:
   establishes a correspondence, in said storage resource, of state information which indicates the pre-fetch state with said access destination information, and makes said state information be "not pre-fetched" at that time;
   when acquiring said parameter information from said local memory, pre-fetches the parameter information into said storage resource in correspondence with said access destination information; and, in this case, updates the state information which is in correspondence with said access destination information to "pre-fetch available"; and
   when receiving a read command from said protocol chip, makes the subject of comparison with the access destination information which has been input into said second comparison circuit be access destination information for which said state information is "pre-fetch available".

4. The storage system according to claim 3, wherein "being pre-fetched" is additionally included in said state information, and said bridge circuit:

when a read command for pre-fetching said parameter information has been issued to said micro processor using certain access destination information, updates the state information which is in correspondence with said access destination information to "being pre-fetched"; and when receiving a read command from said protocol chip, makes the subject of comparison with the access destination information which has been input into said second comparison circuit be access destination information for which said state information is "pre-fetch available" and "being pre-fetched"; and, if the state information which corresponds to the access destination information for which a match is obtained is "being pre-fetched", waits until the pre-fetching of said parameter information is completed, and when said pre-fetching is completed, transmits the pre-fetched parameter information to said protocol chip in response to said read command which is received.

* * * * *